United States Patent [19]
Buck et al.

[11] 3,875,963
[45] Apr. 8, 1975

[54] SWING CHECK VALVE

[75] Inventors: Frank Eugene Buck, Tiburon;
Donald E. Graham, San Leandro;
Larry A. Battaglia, Benicia, all of Calif.

[73] Assignee: Valve Systems International, Inc., Bala Cynwyd, Pa.

[22] Filed: July 27, 1973

[21] Appl. No.: 383,096

[52] U.S. Cl. .............. 137/527.8; 137/556; 251/78; 251/82
[51] Int. Cl. ............................................ F16k 15/03
[58] Field of Search ............ 137/527, 527.6, 527.8, 137/556, 556.3, 556.6, 527.2, 527.4, 326, 522, 523; 251/78, 82, 298, 303, 367

[56] References Cited
UNITED STATES PATENTS

| | | |
|---|---|---|
| 2,293,199 | 8/1942 | Foner .......................... 137/556 X |
| 2,864,401 | 12/1958 | Carr ............................. 251/303 X |
| 3,038,494 | 6/1962 | Gulick ......................... 137/527.2 |
| 3,106,220 | 10/1963 | Hose ........................... 137/527.8 X |
| 3,191,619 | 6/1965 | Allen ........................... 137/527 X |
| 3,358,709 | 12/1967 | Thresher et al. ............. 251/303 X |
| 3,522,929 | 8/1970 | De Simone ................... 251/298 |
| 3,687,155 | 8/1972 | Wheatley ..................... 137/527.8 X |
| 3,720,225 | 3/1973 | Wheatley et al. ............ 137/527.8 X |

*Primary Examiner*—William R. Cline
*Attorney, Agent, or Firm*—Melvin R. Stidham

[57] ABSTRACT

The disclosure is of a swing check valve wherein the valve clapper is of a spherical section configuration with a conical sealing surface at its periphery cooperating with a complementary conical surface of a valve seat. The pivotal mounting for the valve may be manually operated to pivot the valve clapper to full open position or to free it to swing between open and closed position under fluid pressure.

6 Claims, 5 Drawing Figures

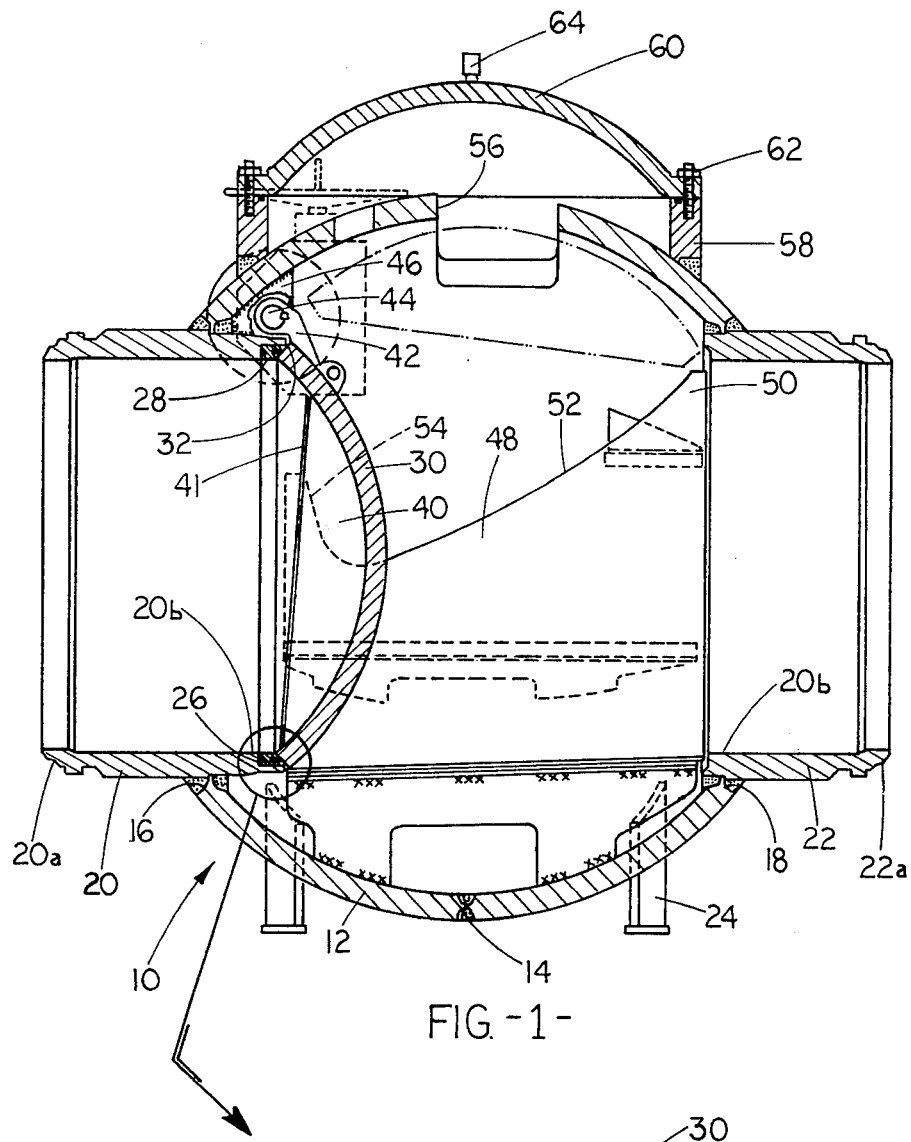
FIG.-1-
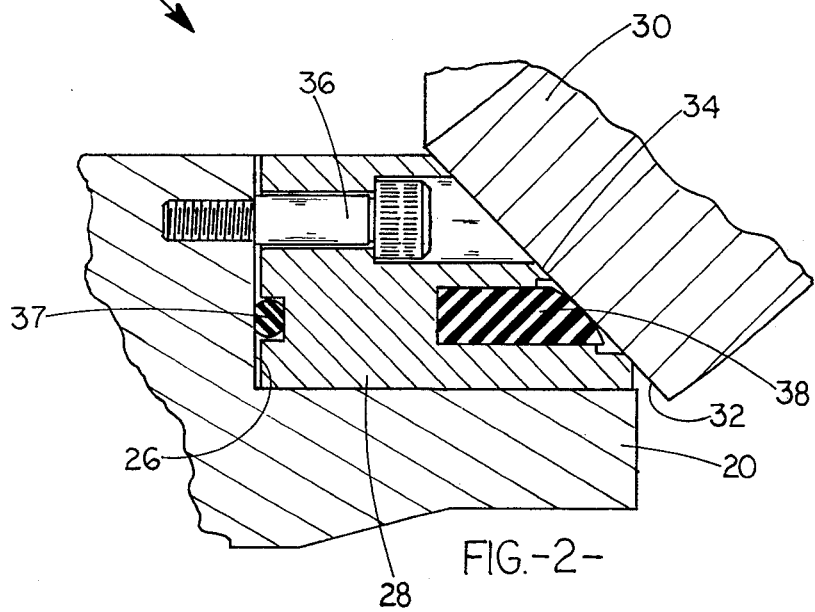
FIG.-2-

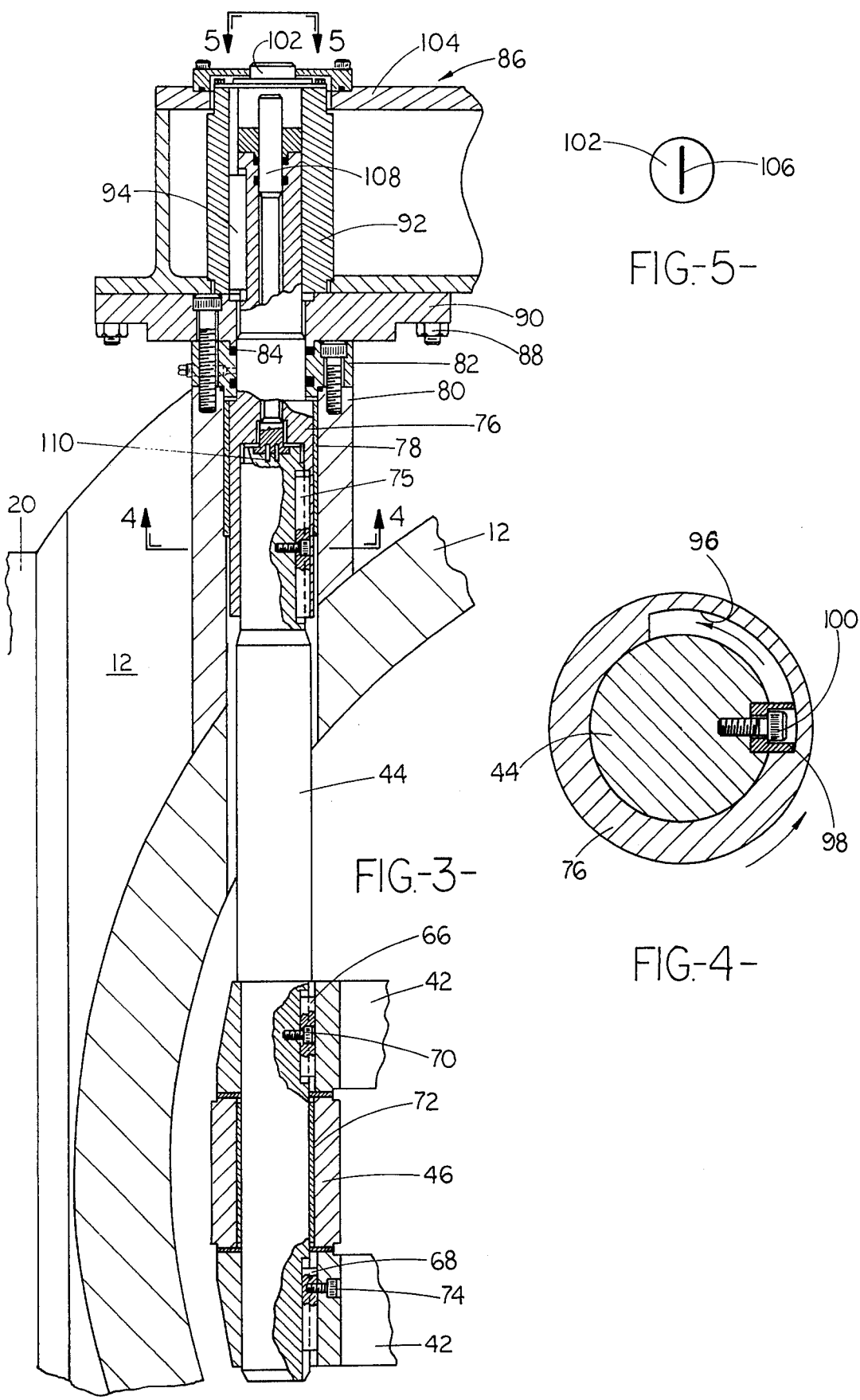
FIG.-3-
FIG.-4-
FIG.-5-

SWING CHECK VALVE

BACKGROUND OF THE INVENTION

Swing check valves are commonly employed in large pipelines for the purpose of providing virtually unimpeded flow during normal pipeline operation but to check flow effectively in the event of a reversal thereof. For example, such a valve may be placed at the foot of a hill crossing to check flow and limit escape of the fluid in the event of a line break.

Particularly in the operation of pipelines for the transportation of petroleum products, it is often desirable to transport different fluids over the same pipeline without intermixing the different products. For example, different weights and grades of lubricating oil and both light and heavy fuel oils may be passed through the pipeline at different times. The various products are separated physically by introducing a "pig," i.e., a sphere or cylinder of rubber or the like, into the line so as to be forced along by the trailing fluid in sealing engagement with the inner wall of the pipe. In addition, such pipelines are often cleaned by the passage of scrapers of generally spherical or cylindrical configuration.

In certain circumstances, it is desirable to direct flow and the resilient spherical or cylindrical pig or scraper in a reverse direction through the pipeline. Since flow in a reverse direction is precluded by a check valve, it becomes necessary to inactivate check valves during reverse flow.

OBJECTS OF THE INVENTION

It is an object of this invention to provide a swing check valve with a clapper member so configurated that its center of gravity is displaced from the valve seat when in closed position whereby there is a valve-closing moment arm even with the pivot mounting adjacent to the valve seat.

It is a further object of this invention to provide a swing check valve with a clapper of dished, spherical configuration.

It is a further object of this invention to provide a swing check valve with a clapper of dished, spherical configuration having a cam member thereon engagable by a sphere passing through the pipeline.

It is a further object of this invention to provide a swing check valve which may be conditioned to swing freely or to be inactivated in full open position.

It is a further object of this invention to provide a swing check valve which may be selectively inactivated in open position and having means for indicating the position of the clapper and the active or inactive condition thereof.

Other objects and advantages of this invention will become apparent from the description to follow when read in conjunction with the accompanying drawings.

BRIEF SUMMARY OF THE INVENTION

In carrying out this invention, a spherical main body section, which may be fabricated from steel plate or the like is provided with cylindrical hubs which adapt the valve for connection into a pipeline. At least one of the cylindrical hubs extends into the interior of the sphere and carries a valve seat ring, thereon for engagement by a complementary sealing surface on a clapper. The clapper is of dished, spherical configuration and is pivotally mounted about an axis extending transverse to and above the inwardly protruding hub. Because of its spherical configuration, the clapper has its center of gravity displaced from the plane of the seat, when in its closed position, a sufficient distance to provide a moment arm biasing the clapper into a closed position.

The sealing edge of the clapper is frusto-conical generally on a radius of the sphere of which the clapper is a section. Similarly, the body seat ring has a complementary frusto-conical sealing surface. In the event of reverse flow, as in a line break, the clapper is slammed shut, and forces generated by fluid pressure asserted against the clapper are transmitted over its spherical section to urge it into firm engagement.

The valve may be conditioned selectively for normal swing check operation or inactivated in full open position so as not to interfere with reverse flow intentionally generated.

BRIEF DESCRIPTION OF THE DRAWINGS

In the drawings:

FIG. 1 is a vertical section view of a swing check valve embodying features of this invention;

FIG. 2 is an enlarged partial section view of the valve sealing arrangement;

FIG. 3 is a partial section view showing the clapper operating mechanism;

FIG. 4 is a section view taken along line 4—4 of FIG. 3; and

FIG. 5 is an end view taken along line 5—5 of FIG. 3.

DESCRIPTION OF A PREFERRED EMBODIMENT

Referring now to FIGS. 1 and 2 with greater particularity, the swing check valve 10 of this invention includes a spherical main body section 12 which may be fabricated from two hemispherical sections, which are formed from steel plates or the like and welded together at 14 along the vertical great circle. The hemispherical sections are formed with upstream and downstream openings 16 and 18 into which upstream and downstream cylindrical hubs 20 and 22 are welded. The hubs shown are finished at their ends 20a and 22a for welding into a pipeline, but it is to be understood that they may be provided with pipeline flanges or any other conventional device for installing the valve 10. Suitable legs 24 may be welded to the spherical section 12 to support the valve erectly, particularly during manufacture and shipping.

As indicated, the upstream hub 20 is slightly longer than the downstream hub 22 and extends into the interior of the spherical main body section 12. An annular recess 26 is formed in the inner end of the upstream hub 20b in order to accommodate a seat ring 28 adapted for sealing engagement with a valve clapper 30. As shown, the clapper is preferably of spherical, dished configuration with a substantially radial edge 32 that engages with a complementary, frusto-conical surface of the seat ring 28.

The seat ring 28 may be secured in place in the recess 26 as by means of cap screws 36 with suitable sealing means, such as an O-ring 37 sealing between the seat ring 28 and the hub 20. A resilient main seal ring 38 provides a bubble tight seal with the clapper 30.

A chordal plate 40 is welded to the clapper 30 so as to be engageable by a sphere entering into the upstream hub to cam the clapper into its elevated position shown in phantom in FIG. 1. The chord along which the cross plate 41 of the T-section 40 extends, commences a small arcuate distance from the upper edge of the clapper so as to present a somewhat greater angle of contact with an approaching sphere.

Arms 42 welded to the clapper 30 are keyed to a shaft 44 which, in turn, is rotatably carried in a bearing support member 46 welded to the inner surface of the main spherical body section 12. The axis of the shaft 44 is located above and slightly upstream of the valve seat sealing surface 34 and, in addition, the spherical, dished configuration of the clapper disposes its center of gravity downstream of the valve seat sealing surface a sufficient distance to present a moment arm about the axis of the shaft 44 causing gravity to bias the clapper more firmly into closed position as shown.

Closely adjacent to and partially surrounding the valve seat, so as to partially embrace the valve clapper in closed position, is a partial sleeve liner 48 which tapers inward in frusto-conical configuration to merge with and form a continuation of the inner surface 22b of the downstream hub 22. As shown, the liner at the downstream end 50 is nearly a complete cylinder but is cut away at 52 to accommodate the clapper as it moves into its full open position shown in phantom. Then, as it embraces the valve seat it is again extended around at 54 to more than 180° of the valve seat circumference. The liner 48 is preferably formed in two or three sections, each of which is inserted in place and radial adjustments made as necessary until the liner is centered. Then the sections of the liner are welded together to form a complete unit.

A slot 56 of a size and configuration sufficient to permit installation of the valve clapper is cut into the top of the spherical section, and the top area is reinforced by the vertical cylindrical body extension 58. In completing the assembly of the valve a top closure 60 is bolted at 62 to the vertical cylindrical body section 58 and may be fitted with a relief or vent valve 64.

Referring now to FIGS. 3 and 4, there are shown the means for operating the valve clapper. The shaft 44 is keyed at 66 and 68 to the arms 42 carried on the valve clapper 30. The key 66 may be secured to the shaft 44 by means of the cap screw 70 and, in assembly, simply inserted through the aligned arms 42 and body mounting 46 wherein it may be rotated in the bearing 72. The key 68 having been previously inserted from the end, is secured to the arm 42 by means of the cap screw 74.

The upper end of the shaft 44 is keyed at 75 in the female end of the drive shaft 76 which is rotatably carried in a bearing 78 in a lateral extension 80 of the body 12. The drive shaft extends through a packing member 82 which carries suitable seal means such as the O-rings 84. A valve operator 86 is bolted at 88 to a mounting plate 90 carried on the lateral body extension 80 to rotate the drive shaft 76 through approximately 90°. For this purpose, the operator drive member 92 is keyed at 94 to the drive shaft 76.

Referring more particularly to FIG. 4, the female receptical of the drive shaft 76 is cut away at 96 through an arc of aproximately 90° whereby the shaft 44 carrying the clapper 30 is free to rotate counterclockwise in FIG. 4 through approximately 90° relative to the drive shaft 76. On the other hand, if it is desired to inactivate the clapper into full open position shown in phantom in FIG. 1, the drive shaft 76 itself may be turned counterclockwise through approximately 90° to carry the shaft 44 with it through a key 98 which is secured to the shaft 44 as by means of a cap screw 100.

An indicator cap 102 which may be transparent is carried on operator drive member 92 and extends through the operating housing 104 and has a marking 106 thereon (FIG. 5) to indicate the position of the operator, i.e., to tell whether the swing check valve is activated or inactivated. In addition, an indicator extension 108 which is pinned at 110 to the end of the shaft 44 extends through the drive shaft 76 so that the end thereof is exposed through the indicator cap 102. This indicates the actual position of the clapper 30.

While this invention has been described in conjunction with a preferred embodiment thereof, it is obvious that modifications and changes therein may be made by those skilled in the art without departing from the spirit and scope of this invention.

What is claimed as invention is:

1. A swing check valve comprising:
   a housing having upstream and downstream flow passageways therein;
   an annular valve seat in said housing surrounding said upstream flow passageway;
   a deeply dished, relatively thin spherical section valve clapper with an annular sealing surface around the concave side thereof;
   a relatively short arm secured to the convex side of said clapper adjacent the upper edge thereof,
   a pivot mounting on said housing located closely above said valve seat and closely adjacent the plane thereof supporting said arm for movement of said clapper between a closed position with said annular sealing surface engaging the outer surface of said valve seat, and an open position displaced therefrom;
   said clapper being sufficiently deeply dished that when in closed position its center of gravity is located well downstream of said pivot mounting to bias said clapper firmly against said valve seat by gravity without weights being carried thereon, despite the proximity of said pivot mounting to the plane of said valve seat;
   said annular sealing surface and said outer sealing surface being of complementary, conical configuration; and
   a chordal member of T-shape in cross-section secured across said concave side of the valve clapper in a direction transverse to the axis of said pivot mounting;
   the cross member of said chordal member presenting a camming surface to pigging devices moving through said upstream flow passageway.

2. The swing check valve defined by claim 1 wherein:
   said annular sealing surface is on a radius of the sphere of which said clapper is a section.

3. The swing check valve defined by claim 1 wherein:
   said camming surface extends diametrically from a point displaced from said sealing surface in the area adjacent said pivot mounting to a point adjacent said sealing surface.

4. The swing check valve defined by claim 1 wherein said pivot mounting comprises:
   a first shaft member rotatably carried on said housing and having an end portion thereof extending outside of said housing;
   means connected to said end portion for tuning said first shaft member;

a second shaft member rotatably carried in said housing;

means securing said valve clapper arm on said second shaft member; and a lost motion coupling between said first and second shaft members enabling said second shaft member to rotate freely in a valve opening direction, but transmitting valve opening rotation of said first shaft member to said shaft member.

5. The swing check defined by claim 4 including:

an extension of said second shaft member extending outside of said housing; and indicator means on said extension to indicate the angular disposition of said second shaft member.

6. A swing check valve comprising:

a housing having upstream and downstream flow passageways therein;

an annular valve seat in said housing surrounding said upstream flow passageway;

a first shaft member rotatably carried on said housing and having an end portion thereof extending outside of said housing;

means connected to said end portion for turning said first shaft member;

a second shaft member rotatably carried in said housing;

a valve clapper secured on said second shaft member;

a lost motion coupling between said first and second shaft members enabling said second shaft member to rotate freely in a valve opening direction, but transmitting valve opening rotation of said first shaft member to said second shaft member;

an extension of said second shaft member extending outside of said housing;

first indicator means on the end portion of said first shaft member for indicating the angular disposition thereof; and second indicator means on said second shaft extension for indicating the angular disposition thereof.

* * * * *